United States Patent
Wilke et al.

(10) Patent No.: US 6,187,384 B1
(45) Date of Patent: Feb. 13, 2001

(54) AQUEOUS BINDER DISPERSION USEFUL FOR PRODUCING HARDLY YELLOWING, HIGHLY GLOSSY COATINGS

(75) Inventors: Guido Wilke, Münster; Dittmar Grapatin, Dülmen; Heinz-Peter Rink, Münster, all of (DE)

(73) Assignee: BASF Coatings AG, Muenster-Hiltrup (DE)

( * ) Notice: Under 35 U.S.C. 154(b), the term of this patent shall be extended for 0 days.

(21) Appl. No.: 09/043,090

(22) PCT Filed: Aug. 17, 1996

(86) PCT No.: PCT/EP96/03626

§ 371 Date: May 1, 1998

§ 102(e) Date: May 1, 1998

(87) PCT Pub. No.: WO97/10276

PCT Pub. Date: Mar. 20, 1997

(30) Foreign Application Priority Data

Sep. 15, 1995 (DE) .............................. 195 34 361

(51) Int. Cl.$^7$ ....................................... B05D 3/02
(52) U.S. Cl. .................. 427/388.4; 427/393; 427/393.5; 427/393.6; 427/407.1; 427/408; 427/409; 427/412.1; 528/44; 524/591; 524/839; 524/840
(58) Field of Search ........................... 528/44; 427/388.4, 427/393.5, 393.6, 393, 408, 409, 412.1, 407.1; 524/591, 839, 840

(56) References Cited

U.S. PATENT DOCUMENTS

| | | | |
|---|---|---|---|
| 1,948,505 | * | 8/1934 | Katsibas . |
| 3,523,792 | * | 8/1970 | Benyi et al. . |
| 4,071,514 | | 1/1978 | Ribbecke et al. . |
| 4,116,902 | | 9/1978 | Harris et al. . |

FOREIGN PATENT DOCUMENTS

| | | |
|---|---|---|
| 2245803 | 3/1973 | (DE) . |
| 42 26 243 A1 | 8/1992 | (DE) . |
| 0 017 199 B2 | 12/1987 | (EP) . |
| 0 379 007 B1 | 1/1990 | (EP) . |

* cited by examiner

Primary Examiner—Erma Cameron

(57) ABSTRACT

The invention relates to binders BM for one-component coating systems, comprising a polyurethane alkyd resin component (A) composed of:

(a) from 5 to 50% by weight of a mixture of:
  (a1) from 90 to 30 parts by weight of an unsaturated C6 to C30 fatty acid containing at least two nonconjugated double bonds, and
  (a2) from 10 to 70 parts by weight of an is unsaturated C6 to C30 fatty acid containing at least two conjugated double bonds as esterified polymer side chains of the polyurethane alkyd resin component (A) and
(b) from 95 to 50% by weight of polyurethane units as polymer main chains of the polyurethane alkyd resin component (A).

15 Claims, No Drawings

US 6,187,384 B1

AQUEOUS BINDER DISPERSION USEFUL FOR PRODUCING HARDLY YELLOWING, HIGHLY GLOSSY COATINGS

FIELD OF THE INVENTION

The invention relates to aqueous binder dispersions for preparing high-gloss coatings which are low in yellowing, comprising polyurethane alkyd resin components with a specific content and a specific combination of polyunsaturated fatty acid substituents as polymer side chains, and to their use as coating compositions, especially for wood and plastic.

BACKGROUND OF THE INVENTION

Aqueous polyurethane dispersions have long been known as binders in the preparation of coatings on metallic, mineral, wood or plastic substrates.

For example, polyurethane resin dispersions having a segment structure of the polymer backbone which leads to a two-phase or more-than-two-phase character and, associated therewith, to excellent elastic properties of the resins have been described (cf. e.g.: Dr. H.-P. Klein and Dr. M. Schwab, Kunstharz-Nachrichten 29, pages 38 to 42, 1993). In these dispersions, for example, long-chain polyether-, polyester- or polycarbonate-polyol units form the soft segments and urethane units, formed from diisocyanate, glycol and dihydroxycarboxylic acid, the hard segments.

Moreover, oxidatively drying polyurethane-alkyd resin hybrids are known, which carry unsaturated fatty acids as substituents and which are employed, in particular, in the field of corrosion protection.

DE-A 3901190 describes alkyd resins based on polyesterpolyols which are reacted with a 2,2-bis(hydroxymethyl)alkanecarboxylic acid and a diisocyanate component in a one-pot reaction so as to give a resin having a weight-average molecular weight Mw of from 10,000 to 70,000 daltons, an acid number of from 18 to 36 mg of KOH/g, which still contains free hydroxyl groups but no longer contains isocyanate groups, with from 45 to 100% of the carboxyl groups introduced into the resin being converted to carboxylate groups by addition of a base.

DE-A 4326270 embraces two-component polyurethane coating compositions, especially for the preparation of multicoat finishes in the automotive sector, which comprise aqueous dispersions of water-soluble or water-dispersible binders having isocyanate-reactive groups, as well as polyisocyanates as crosslinking components. Examples described of suitable binders are alkyd-free anionic polyesters, prepared from polyalcohols and polycarboxylic acids having hyroxyl numbers of between 10 and 200 mg of KOH/g, acid numbers of between 10 and 100 mg of KOH/g and number-average molecular weights Mn of between 1000 and 100,000 daltons.

DE-A 4328092 describes emulsifier-free aqueous coating compositions which contain as binder a combination of (A) a mixture of one or more water-dilutable polyurethane resins and/or alkyd-urethane resins, which may contain unsaturated fatty acid residues as substituents, with one or more water-dilutable (meth)acrylate copolymers, polyurethane resins and/or polyester resins, and (B) one or more amino resins and one or more blocked polyisocyanates. The binders described have acid numbers of between 10 and 100 mg of KOH/g, hydroxyl numbers of between 10 and 150 mg of KOH/g and number-average molecular weights of between 2000 and 10,000 daltons.

DE-A 4226243 describes water-dilutable coating compositions comprising (A) film-forming polymerpolyols in the form of aqueous dispersions of fatty acid-modified polyurethane resins and/or fatty acid-modified polyester resins (alkyd resins) with saturated and unsaturated fatty acid residues, and (B) polyisocyanates having more than one free isocyanate group, with or without the addition of one or more organic solvents and of the customary paint additives, such as pigments, fillers or rheological auxiliaries, as two-component coating compositions.

In the case of so-called do-it-yourself decorating paints, which are employed predominantly in the coating of wood, plastic or metal substrates, there is a need for low-solvent one-component systems which ensure rapid curing of the coating at room temperature. Moreover, such decorating paints should be low in yellowing, stable to weathering, mar-resistant and of high gloss, and should have a high resistance to water. In particular, the resistance to yellowing, which is essentially induced by oxidative processes, and the low solvent content in the coating material, which is required as a result of increasingly more restrictive environmental protection regulations, are of outstanding importance for decorating paints.

SUMMARY OF THE INVENTION

It has surprisingly been found that paint binders based on alkyd resin, with a specific combination of unsaturated fatty acids each containing at least two double bonds in the carbon chain, in the alkyd component of the paint binder, together with a reduced solvent content in the binder component, achieve these objects outstandingly.

The novel one-component coating materials comprise binders BM consisting essentially of a polyurethane alkyd resin component (A) composed of:
  (a) from 5 to 50% by weight of a mixture of:
    (a1) from 90 to 30 parts by weight of an unsaturated C6 to C30 fatty acid containing at least two nonconjugated double bonds, and
    (a2) from 10 to 70 parts by weight of an unsaturated C6 to C30 fatty acid containing at least two conjugated double bonds as esterified polymer side chains of the polyurethane alkyd resin component (A) and
  (b) from 95 to 50% by weight of polyurethane units as polymer main chains of the polyurethane alkyd resin component (A).

The mixture (a) preferably consists of from 80 to 50 parts by weight of (a1) and, correspondingly, from 20 to 50 parts by weight of (a2), particularly preferably of from 80 to 60 parts by weight of (a1) and, correspondingly, from 20 to 40 parts by weight of (a2).

In a particularly preferably embodiment of the invention, linoleic acid is employed as component (a1) and C18 conjuene fatty acid as component (a2).

For the synthesis of the polyurethane units (b) it is preferable to employ polyesterpolyols (b1) which as alcohol units (b11) preferably contain aliphatic, cycloaliphatic and/or araliphatic alcohols having per molecule 1–6 hydroxyl groups attached to nonaromatic carbon atoms, and as acid units (b12) preferably contain aliphatic, cycloaliphatic saturated or unsaturated and/or aromatic polybasic carboxylic acids, preferably di-, tri- and tetracarboxylic acids or their anhydrides or esters. The polyesterpolyols preferably possess acid numbers of between 1 and 10 mg of KOH/g, particularly preferably between 2 and 5 mg of KOH/g, and preferably hydroxyl numbers of between 100 and 250 mg of KOH/g, particularly preferably between 140 and 160 mg of KOH/g.

Preferred polyisocyanates (b2) for the introduction of the urethane groups into the polyester main chain have 4 to 25 carbon atoms and 2 to 4 isocyanate groups per molecule.

The polyurethane alkyd resin components (A) preferably have acid numbers of between 15 and 40 mg of KOH/g, particularly preferably between 20 and 30 mg of KOH/g, and preferably hydroxyl numbers of between 90 and 150 mg of KOH/g, particularly preferably between 100 and 130 mg of KOH/g. The content of urethane groups in the polyurethane alkyd resin components (A) is preferably between 5 and 15% by weight based on (A), particularly preferably between 5 and 10% by weight.

The aqueous binder dispersions BM preferably contain less than 2% by weight of solvents, particularly preferably less than 1% by weight based on the binder dispersion BM.

Furthermore, the aqueous binder dispersions BM may contain between 0 and 20% by weight, preferably between 0 and 10% by weight, based on (A), of additional crosslinking components (B), which are preferably able to react at room temperature with the excess hydroxyl and/or carboxyl groups of the polyurethane alkyd resin component (A).

DETAILED DESCRIPTION OF THE PREFERRED EMBODIMENTS

The Components of Polyurethane Alkyd Resin Component (A)

The mixture (a) which makes up the polymer side chains, consisting of unsaturated fatty acids (a1) having at least two nonconjugated double bonds and unsaturated fatty acids (a2) having at least two conjugated double bonds, is present in proportions of from 5 to 50% by weight, based on the polyurethane alkyd resin component (A), calculated as triglyceride (oil length), preferably in proportions of from 10 to 45% by weight.

Components (a1) and (a2) are generally termed drying fatty acids and preferably have between 6 and 30, particularly preferably between 8 and 24, carbon atoms per molecule.

Examples which may be mentioned of the unsaturated fatty acids (a1) having at least two nonconjugated double bonds are: linolenic acid and, preferably, linoleic acid as C18 fatty acids.

An example which may be mentioned of the unsaturated fatty acids (a2) having at least two conjugated double bonds, also called conjuene fatty acids, is preferably the conjugated linoleic acid having two double bonds, in conjugation, on the 9th and on the 11th carbon atom of the C17-alkyl chain of the C18 fatty acid.

The fatty acids (a1) and (a2) are present, for example, in natural oils such as linseed oil, soya oil, safflower oil, cottonseed oil or castor oil, sunflower oil, groundnut oil, wood oil and ricinene oil. The fatty acids obtained therefrom are linseed oil fatty acid, safflower oil fatty acid, tallow oil fatty acid, cottonseed oil fatty acid, groundnut oil fatty acid, wood oil fatty acid, ricinenic fatty acid or, preferably, sunflower oil fatty acid.

The polyurethane units (b) which make up the polymer main chain are composed of polyesterpolyols (b1) and polyisocyanates (b2) such that the content of urethane groups in the polyurethane alkyd resins is preferably between 5 and 15% by weight based on (A), particularly preferably between 5 and 10% by weight based on (A). The acid numbers of the polyesterpolyols (b1) are preferably between 1 and 10 mg of KOH/g, particularly preferably between 2 and 5 mg of KOH/g, while the hydroxyl number of the polyesterpolyols (b1) is preferably between 100 and 250 mg of KOH/g, particularly preferably between 140 and 160 mg of KOH/g. The number-average molecular weights Mn of the polyesterpolyols are between 800 and 2000 daltons, preferably between 1000 and 1500 daltons.

The polyesterpolyols (b1) are composed of alcohol units (b11) and acid units (b12).

Preferred alcohol units (b11) used are aliphatic, cycloaliphatic and/or araliphatic alcohols having 1 to 6, preferably 1 to 4, hydroxyl groups attached to nonaromatic carbon atoms. Examples which may be mentioned of (b12) are:

ethylene glycol, propane-1,2- and -1,3-diol, butane-1,2-, -1,3- and -1,4-diol, 2-ethylpropane-1,3-diol, 2-methylpropanediol, 2-butyl-2-ethylpropanediol, 2-ethylhexane-1,3-diol, 1,3-neopentylglycol, 2,2-dimethylpentane-1,3-diol, hexane-1,6-diol, cyclohexane-1,2- and -1,4-diol, 1,2- and 1,4-bis(hydroxymethyl)cyclohexane, bis(4-hydroxycyclohexyl)methane, adipic acid bis(ethylene glycol ester), ether alcohols, such as di- and triethylene glycol, dipropylene glycol, perhydrogenated bisphenols, butane-1,2,4-triol, hexane-1,2,6-triol, trimethylolethane, trimethylolpropane, trimethylolhexane, glycerol, pentaerythritol, dipentaerythritol, mannitol and sorbitol, and chain-terminating monoalcohols having 1 to 8 carbon atoms such as propanol, butanol, cyclohexanol, benzyl alcohol and hydroxypivalic acid. Alcohols preferably employed are: glycerol, trimethylolpropane, neopentylglycol and pentaerythritol.

In order to obtain water-dispersible polyurethane alkyd resin components (A), at least some of the monomer units (b11) employed are polyols containing anionic groups or groups which can be converted into anionic groups, such as, for example, carboxyl groups. Preferably employed for this purpose are alkanoic acids having one to two hydroxyl substituents. These polyols generally have 1 to 3, preferably one carboxyl group in the molecule, and preferably 3 to 15 carbon atoms per molecule. Examples of such compounds are: hydroxypivalic acid, dihydroxypropionic acid, dihydroxysuccinic acid, dihydroxybenzoic acid and/or dihydroxycyclohexanemonocarboxylic acid. Particular preference as monomer unit is given to the 2,2-dimetylolalkanoic acids having alkyl radicals of up to 20 carbon atoms, for example 2,2-dimethylolacetic acid, 2,2-dimethylolpentanoic acid or, with very particular preference, 2,2-dimethylolpropionic acid. The proportion of carboxyl-containing monomers in the entirety of the polyol units (b11) is chosen such that the acid number of the polyurethane alkyd resin component (A) is preferably between 15 and 40 mg of KOH/g, particularly preferably between 20 and 30 mg of KOH/g.

As acid units (b12) it is preferred to employ aliphatic, cycloaliphatic saturated or unsaturated and/or aromatic polybasic carboxylic acids, particularly preferably di-, tri- and tetracarboxylic acid, and their anhydrides and/or their esters. Examples which may be mentioned are: phthalic acid (anhydride), isophthalic acid, terephthalic acid, tetrahydro- or hexahydrophthalic acid (anhydride), endomethylenetetrahydrophthalic acid, succinic acid, glutaric acid, sebacic acid, azelaic acid, trimellitic acid, trimellitic anhydride, pyromellitic acid (anhydride), fumaric and maleic acid. The most common are isophthalic acid and phthalic acid (anhydride).

Preferred polyisocyanates (b2) are those having 4 to 25 carbon atoms and 2 to 4 isocyanate groups per molecule. Particular preference is given to aliphatic, cycloaliphatic, araliphatic or aromatic diisocyanates, for example: 1,2-ethylene diisocyanate, 1,4-tetramethylene diisocyanate, 1,6- hexamethylene diisocyanate, 2,2,4- and/or 2,4,4-trimethyl-1,6-hexamethylene diisocyanate, 1,12-dodecane diisocyanate, cyclobutane 1,3-diisocyanate, cyclohexane 1,3- and 1,4-diisocyanate, 2,2- and 2,6-diisocyanato-1-methylcyclohexane, 3-isocyanatomethyl-3,5,5-trimethylcyclohexyl isocyanate (isophorone diisocyanate), 2,5- and 3,5-bis(isocyanatomethyl)-8-methyl-1,4-methano-decahydronaphthalene, 2,6-bis(isocyanato)-4,7-methano-hexahydroindane, dicyclohexyl 2,4'- and 4,4'-diisocyanate, 2,4- and 2,6-hexahydrotolylene diisocyanate, perhydro-2,4'- and -4,4'-dipheyl/methane diisocyanate, 1,3- and 1,4-phenylene diisocyanate, 4,4'-diisocyanatodiphenyl, 4,4'-diisocyanato-3,3'-dimethoxydiphenyl, 4,4'-diisocyanato-3,3'-dimethyldiphenyl, 4,4'-diisocyanato-3,3'-dipenyldiphenyl, 2,4'- and 4,4'-diisocyanatodiphenylmethane, naphthylene 1,5-diisocyanate, tolylene diisocyanate, such as 2,4- and/or 2,6-tolylene diisocyanate, N,N'-(4,4'-dimethyl-3,3'-diisocyanato-diphenyl)uretdione, m-xylylene diisocyanate, tetramethyl-xylylene diisocyanate or triisocyanates, such as 2,4,4'-triisocyanatodiphenyl ether, 4,4',4"-triisocyanatotriphenylmethane, tris(4-isocyanatophenyl) thiophosphate. Particular preference is given in general to the readily industrially available aliphatic or cycloaliphatic polyisocyanates, such as, in particular, hexamethylene diisocyanate, 4,4'-di(isocyanatocyclohexyl)methane and isophorone diisocyanate, and the araliphatic tetramethylxylylene diisocyanate.

The Preparation of the Polyurethane Alkyd Resin Components (A)

The polyurethane alkyd resins (A) are preferably prepared in a two-stage or more-than-two-stage process comprising first of all the synthesis of the polyesterpolyol component (b1), containing the unsaturated fatty acids (a1) and (a2) as monomer units, after which (b1) is reacted in a further process step with the polyisocyanate (b2) to give the polyurethane alkyd resin component.

The preparation of component (b1), which can also be termed hydroxy-functional alkyd resin, is carried out in the presence of from 0.01 to 2.5% by weight, based on the alkyd resin component (b1), of catalysts such as, preferably, dialkyl- or dialkoxytin oxides with azeotropic removal of the water of reaction by distillation, such that the alkyd resin (b1) has an acid number of preferably less than 10 mg of KOH/g, particularly preferably of less than 5 mg of KOH/g.

The component (b1) prepared in this way is reacted, in a further process step, with the polyisocyanate (b2) in proportions by weight such that the resulting polyurethane alkyd resin (A) has a content of urethane groups of preferably between 5 and 15% by weight based on (A), particularly preferably between 5 and 10% by weight. The reaction is preferably continued until free isocyanate can no longer be detected. The acid number of the polyurethane alkyd resin (A) is preferably between 15 and 40 mg of KOH/g, particularly preferably between 20 and 30 mg of KOH/g, while the hydroxyl group number is preferably between 90 and 150 mg of KOH/g, particularly preferably between 100 and 130 mg of KOH/g.

In a prior reaction step the polyisocyanates (b2) are preferably reacted with hydroxycarboxylic acids as contained, for example, in the above list for the synthesis of the hydroxyfunctional alkyd resin (b1). This is used, preferably, to control the acid number in the polyurethane alkyd resin (A).

The number-average molecular weights Mn (determined by gel permeation chromatography) of the polyurethane alkyd resins (A) are generally between 1000 and 100,000, preferably between 2000 and 50,000, particularly preferably between 2000 and 20,000, daltons.

The solution of the polyurethane alkyd resin (A) is then neutralized, preferably with a preferably organic base, for example ammonia or organic amines, such as triethylamine, N-methylmorpholine or amino alcohols, such as dimethylisopropanolamine, 2-amino-2-methylpropan-1-ol or, preferably, dimethylethanolamine. In principle, the preparation of the novel polyurethane alkyd resin can be carried out in bulk or in solution.

The solvents used for the preparation of the polyurethane alkyd resin (A) are preferably inert toward isocyanate and are water-dilutable, such as, for example, ketones, esters or ethers, for example acetone, N-methylpyrrolidone, dipropylene glycol dimethyl ether, ethyl ethoxypropionate or, with particular preference, methyl ethyl ketone.

However, it is also possible if desired to use water-dilutable solvents which are not inert toward isocyanate, such as, for example, monofunctional alcohols, for example butanol, n-propanol, isopropanol; ether alcohols, for example butoxyethanol, methoxypropanol, ethoxypropanol, butoxypropanol; dialcohols, for example ethylene glycol; trialcohols, for example glycerol.

When using alcohols as solvents it should be noted that they may occur as reactants in the preparation of components (b1) and in the subsequent reaction of (b1) with (b2) to give (A).

It is likewise possible to employ solvents which are dilutable in water only slightly, if at all, and are inert toward isocyanate, such as ethers, esters, etheresters or ketones.

The Coating Formulations

Up to a proportion of 25% by weight, preferably up to 15% by weight, the binder BM may include, in addition to the polyurethane alkyd resin component (A), resins different from (A), such as, for example, (meth)acrylic copolymers, polyester resins and/or polyurethane resins other than (A).

The binders BM are aqueous dispersions and contain less than 5% by weight, preferably less than 2% by weight and, with particular preference, less than 1% by weight of solvent. The proportion of component (A) in the binder BM is between 20 and 75% by weight, preferably between 25 and 65% by weight and, with particular preference, between 30 and 60% by weight.

In addition to the resin components the novel one-component coating material contains at least one inorganic and/or organic color pigment or special-effect pigment and, if desired, a filler as well.

Examples of color-imparting pigments or fillers are: titanium dioxide, iron oxide pigments, carbon blacks, silica, aluminum silicate, anticorrosion pigments, such as lead compounds and chromate compounds, barium sulfate, mica, talc, kaolin, chalk, azo dye pigments, phthalocyanine dye pigments or ultramarine blue.

Examples of special-effect pigments are: metal pigments, for example of aluminum, copper or other metals, interference pigments, for. example metal oxide-coated metallic pigments, coated micas, for example titanium oxide-coated mica, and graphite effect pigments.

The pigments are generally employed in the form of a paste which is, for example, commercially customary or is formulated, preferably, by combining some of the binder resin, water, wetting agent and pigment, together if desired with a filler, and is ground in equipment familiar to the person skilled in the art, for example a bead mill, to a defined pigment particle size, preferably between 10 and 15 micrometers. In this context it must be ensured that, during the milling process, the stability of the aqueous dispersion is retained. If appropriate, further dispersion auxiliaries can be added for this purpose.

The weight ratio of pigment to binder is in general between 0.01:1 and 4:1, preferably between 0.3:1 and 1:1.

Furthermore, the coating material generally comprises rheology-controlling agents such as, for example, polymer microparticles, inorganic phyllosilicates, for example aluminum-magnesium phyllosilicates, sodium-magnesium phyllosilicates and sodium-magnesium-fluorolithium phyllosilicates of the montmorillonite type, and associated thickeners, based for example on polyurethane or cellulose, or polyvinyl alcohol, poly(meth)acrylamide or polymers containing ionic groups, for example poly(meth)acrylic acid.

In minor proportions of up to 20% by weight, preferably of up to 10% by weight based on the binder (A), the novel coating formulations may contain components (B) which at the application temperatures crosslink the binders chemically, in other words with the formation of covalent bonds. The components (B) preferably react with the free hydroxyl groups of the polyurethane alkyd resin (A) with formation of a three-dimensional network. Examples of such crosslinking components (B) are: polyisocyanates, as listed as component (b2) of the polyurethane alkyd resin (A), or polyepoxides.

The novel coating formulations are applied to the substrates to be coated by means of the techniques which are customary per se, such as, for example, dipping, knife coating, rolling or spraying, in the course of which the film which forms becomes crosslinked. Crosslinking takes place at temperatures between 0 and 100 degrees C., preferably between 10 and 60 degrees C., particularly preferably between 15 and 40 degrees C. (room temperature conditions). The film thicknesses of the novel coating materials applied depend on the application and on the coating formulation. For example, clearcoat finishes have film thicknesses of between 40 and 100 micrometers, pigmented basecoats or topcoats have film thicknesses of between 50 and 120 micrometers, filler coatings or coatings to protect against mechanical impact stress have film thicknesses of between 70 and 160 micrometers, and primers have film thicknesses of between 50 and 110 micrometers.

Suitable substrates for the novel coating formulations are any desired substrates, for example metal substrates such as iron, steels, aluminum or zinc. Suitable nonmetallic substrates which may be mentioned are mineral substrates, for example concrete, plasters or glass, wood or plastics, for example polyolefins, polyurethanes, polystyrene, polycarbonate, poly(meth)acrylates or polyvinyl chloride. If desired, the substrates may possess existing coatings. The novel coating formulations can be applied, alone or together with other coating compositions, in one or more steps. In applying the coating material it can be applied to dried coated or to a wet coated substrate, it being possible in the case of the latter technique to interpose a short flash-off phase. In the case of the multistep coating technique the novel coating material can be applied on its own in two or more steps, it being possible for the coated substrate prepared in the preliminary step to be dry or wet.

The examples which follow are intended to illustrate the invention in more detail.

EXAMPLES

Example 1

Preparation of the Polyol Alkyd Resin Component (b1) from the Monomer Units (a1), (a2), (b11) and (b12):

80 g of neopentylglycol, 647 g of trimethylolpropane, 331 g of isophthalic acid, 308 g of hexahydrophthalic anhydride, 792 g of a mixture of commercially customary linoleic acid and C18 fatty acid with conjugated double bonds, the linoleic acid making up a proportion of 75% by weight and the C18 fatty acid with conjugated double bonds making up the proportion to supplement the mixture to 100% by weight, are heated in a reactor, in the presence of 0.48 g of dibutyltin oxide as catalyst and of 40 g of xylene as entraining agent, and with azeotropic removal of the reaction product water, until an acid number of 4 mg of KOH/g is reached. After cooling, the product is dissolved in 212 g of methyl ethyl ketone.

Example 2

Preparation of the Aqueous Binder Dispersion BM, Containing the Polyurethane Alkyd Resin (A), from the Polyolalkyd Resin Component (b1) According to Example 1

303 g of tetramethylxylylene diisocyanate and 83 g of dimethylolpropionic acid are heated in 809 g of methyl ethyl ketone in a suitable reaction vessel at 80 to 82 degrees C. until the NCO content of the preadduct is 4.4%. Cooling is then carried out to 50 degrees C., 1285 g of the polyolalkyd resin component (b1) prepared according to Example 1 are added, and reaction is carried out at 80 degrees C. until free isocyanate can no longer be detected. Thereafter, 44 g of dimethylaminoethanol are added for neutralization, and the polyurethane alkyd resin (A) formed is dispersed in 1050 g of deionized water. The methyl ethyl ketone is then removed by azeotropic distillation to a residual content of 0.78% by weight, based on the end product, and the dispersion is adjusted with deionized water to a content of polyurethane alkyd resin (A) of 40% by weight.

Example 3

Preparation of a White Pigment Paste 18 g of the binder dispersion BM according to Example 2 are mixed, following the addition of 6 g of deionized water and 8.9 g of a commercially customary dispersant based on anionic and nonionic constituents (Disperse Ayd W22 R from Krahn Chemie GmbH), with 60 g of titanium dioxide pigment (rutile type R-HD2 R from Tioxide). This mixture is adjusted with deionized water to a solids content of 70% and dispersion is carried out to completion, in a bead mill, to a pigment particle diameter of from 10 to 15 micrometers.

Example 4

Preparation of a Blue Pigment Paste 15 g of the binder dispersion BM according to Example 2 are mixed with 21 g of deionized water, 13 g of the abovementioned wetting agent, 5 g of propylene glycol and 38 g of a commercially customary blue pigment (Colorindex PB 15 R). This mixture is adjusted with deionized water to a solids content of 54% and dispersed to completion, in a bead mill, to a pigment particle diameter of from 15 to 20 micrometers.

Example 5

Preparation of a White Water-dilutable High-gloss Paint 1.8 g of siccative mixture consisting of strontium octoate, cobalt octoate and calcium octoate (50% by weight solids content, Siccatol R 938 from AKZO), are dispersed in 64 g of the binder dispersion BM according to Example 2. Then 21 g of the white pigment paste according to Example 3, 4 g of butylglycol, 0.5 g of a commercially customary thickener (polyurethane-based, 25% by weight solids content, Rheolate R 278 from Kronos Titan GmbH) and 0.3 g of a commercially customary antifoam (polysiloxane-based, Byk R 024 from Byk Chemie) are added with stirring. Thereafter, 5 g of a nonionic wax emulsion (Aquacer R 535 from Byk-Cera Chemie B.V.) and a digested mixture of 0.3 g of a Theological additive (Bentone R LT from Kronos Titan GmbH) and 3.3 g of deionized water are added with stirring. Subsequently, deionized water is used to establish an application viscosity of from 950 to 1050 mPas.

Example 6
Preparation of a Blue Water-dilutable High-gloss Paint 2.1 g of a siccative mixture consisting of cobalt octoate, manganese octoate and zirconium octoate (solids content 44% by weight, Additol R VXW 4952 from Hoechst AG) are dispersed in 63 g of the binder dispersion according to Example 2. Then 12 g of the blue paste according to Example 4 and 6 g of the white paste according to Example 3 are added with stirring. In analogy to Example 5, thereafter, 4 g of butylglycol, 0.5 g of thickener and 0.3 g of a commercially customary antifoam (Agitan R 703 N from Münzing Chemie GmbH) are added with stirring. Subsequently, in analogy to Example 5, 5 g of a nonionic wax emulsion are added and then deionized water is used to establish an application viscosity of from 950 to 1050 mPas.

What is claimed is:

1. An aqueous dispersion for one-component coating systems, the aqueous dispersion comprising a binder which comprises a polyurethane alkyd resin component (A), component (A) consisting essentially of:
   (a) from 5 to 50% by weight of a mixture of:
      (a1) from 90 to 30 parts by weight of an unsaturated C6 to C30 fatty acid containing at least two nonconjugated double bonds, and
      (a2) from 10 to 70 parts by weight of an unsaturated C6 to C30 fatty acid containing at least two conjugated double bonds
      as esterified polymer side chains of the polyurethane alkyd resin component (A), and
   (b) from 95 to 50% by weight of polyurethane units as polymer main chains of the polyurethane alkyd resin component (A).

2. The aqueous dispersion of claim 1, wherein the mixture of (a) is from 80 to 50% by weight of (a1) and from 20 to 50% by weight of (a2).

3. The aqueous dispersion of claim 1, wherein linoleic acid is employed as component (a1) and a C18 conjuene fatty acid as component (a2).

4. The aqueous dispersions of claim 1, wherein the polyurethane units of (b) are composed of:
   (b1) polyesterpolyols and
   (b2) polyisocyanates.

5. The aqueous dispersion of claim 4, wherein polyesterpolyols (b1) comprise:
   (b11) aliphatic, cycloaliphatic and/or araliphatic alcohols having per molecule 1 to 6 hydroxyl groups attached to nonaromatic carbon atoms, and
   (b12) aliphatic, cycloaliphatic saturated and/or unsaturated and/or aromatic polybasic carboxylic acids, their anhydrides and/or their esters.

6. The aqueous dispersion of claim 4, wherein polyisocyanates (b2) have 4 to 25 carbon atoms and 2 to 4 isocyanate groups per molecule.

7. The aqueous dispersion of claim 1, having a content of organic solvents of less than 2% by weight based on (A).

8. The aqueous dispersion of claim 7, having a content of organic solvents of less than 1% by weight based on (A).

9. The aqueous dispersion of claim 1, wherein polyurethane alkyd resin component (A) has an acid number of between 15 and 40 mg of KOH/g and a hydroxyl number of between 90 and 150 mg of KOH/g.

10. The aqueous dispersion of claim 1, wherein polyurethane alkyd resin component (A) has a content of urethane groups of between 5 and 15% by weight based on (A).

11. The aqueous dispersion of claim 1, wherein binder further comprises up to 25% by weight, based on (A), of resins different from (A).

12. The aqueous dispersion of claim 11, wherein binder further comprises up to 20% by weight, based on (A), of a crosslinking component (B) that is reactive at temperatures below 60 degrees C. with hydroxyl and/or carboxyl groups of the polyurethane alkyd resin component (A).

13. A method of coating a substrate, comprising:
   providing a substrate;
   coating the substrate with a one-component coating system to produce a coated substrate, the one-component coating system comprising a binder which comprises a polyurethane alkyd resin component (A), component (A) consisting essentially of:
      (a) from 5 to 50% by weight of a mixture of:
         (a1) from 90 to 30 parts by weight of an unsaturated C6 to C30 fatty acid containing at least two nonconjugated double bonds, and
         (a2) from 10 to 70 parts by weight of an unsaturated C6 to C30 fatty acid containing at least two conjugated double bonds
         as esterified polymer side chains of the polyurethane alkyd resin component (A), and
      (b) from 95 to 50% by weight of polyurethane units as polymer main chains of the polyurethane alkyd resin component (A), and
   curing the coated substrate at a temperature of between 10 to 60° C.

14. The method of claim 13 wherein the substrate is selected from the group consisting of mineral, metal, wood and plastic substrates.

15. The method of claim 13 wherein the substrate has been previously coated.

* * * * *